(12) United States Patent
Weng et al.

(10) Patent No.: US 11,461,007 B2
(45) Date of Patent: Oct. 4, 2022

(54) METHOD, DEVICE, AND COMPUTER PROGRAM PRODUCT FOR DETERMINING FAILURES AND CAUSES OF STORAGE DEVICES IN A STORAGE SYSTEM

(71) Applicant: EMC IP Holding Company LLC, Hopkinton, MA (US)

(72) Inventors: Lingdong Weng, Beijing (CN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/150,221

(22) Filed: Jan. 15, 2021

(65) Prior Publication Data

US 2022/0197507 A1 Jun. 23, 2022

(30) Foreign Application Priority Data

Dec. 17, 2020 (CN) .......................... 202011502860.7

(51) Int. Cl.
*G06F 3/06* (2006.01)
(52) U.S. Cl.
CPC .......... *G06F 3/0604* (2013.01); *G06F 3/0655* (2013.01); *G06F 3/0676* (2013.01); *G06F 3/0677* (2013.01); *G06F 3/0679* (2013.01)
(58) Field of Classification Search
CPC .... G06F 3/0604; G06F 3/0655; G06F 3/0677; G06F 3/0676; G06F 3/0679
See application file for complete search history.

(56) References Cited

U.S. PATENT DOCUMENTS

| | | | | | |
|---|---|---|---|---|---|
| 5,828,583 | A | * | 10/1998 | Bush | .................... H04L 41/0233 702/186 |
| 5,923,876 | A | * | 7/1999 | Teague | .................. G06F 11/008 |
| 8,316,263 | B1 | * | 11/2012 | Gough | .................. G06F 11/008 706/21 |
| 10,223,224 | B1 | * | 3/2019 | Hickey | ............... G06F 11/2221 |
| 11,237,890 | B2 | * | 2/2022 | Verburg | ............. G06F 11/3476 |
| 2015/0074450 | A1 | * | 3/2015 | Blount | ................ G06F 11/0727 714/6.1 |
| 2017/0212799 | A1 | * | 7/2017 | Konireddygari | .... G06F 11/0709 |
| 2020/0104200 | A1 | * | 4/2020 | Kocberber | ........... G06K 9/6256 |

* cited by examiner

*Primary Examiner* — Mark A Giardino, Jr.
(74) *Attorney, Agent, or Firm* — Womble Bond Dickinson (US) LLP (57) ABSTRACT

Embodiments of the present disclosure relate to a method, an electronic device, and a computer program product for managing a storage system. The method includes: if it is determined based on current values of a plurality of attribute parameters of a storage device in a storage system that the storage device will have a fault, determining whether the fault of the storage device will not occur again based on reference values of attribute parameters in a first set in the plurality of attribute parameters and current values of attribute parameters in a second set in the plurality of attribute parameters. The method further includes: if it is determined that the fault of the storage device will not occur again, determining a cause of the fault based on the attribute parameters in the first set. The embodiments of the present disclosure can analyze a cause of a fault of a storage device, thereby avoiding the misjudgment of a storage device having no internal fault as a storage device having an internal fault.

20 Claims, 6 Drawing Sheets

METHOD, DEVICE, AND COMPUTER PROGRAM PRODUCT FOR DETERMINING FAILURES AND CAUSES OF STORAGE DEVICES IN A STORAGE SYSTEM

CROSS-REFERENCE TO RELATED APPLICATION

This patent application claims priority, under 35 U.S.C. § 119, of Chinese Patent Application No. 202011502860.7, filed Dec. 17, 2020, which is incorporated by reference in its entirety.

TECHNICAL FIELD

Embodiments of the present disclosure generally relate to the field of data storage, and in particular, to a method, a device, and a computer program product for managing a storage system.

BACKGROUND

In a storage system, in order to avoid data loss caused by a fault of a storage device, it is necessary to conduct fault prediction on the storage device. With the rapid development of technologies such as artificial intelligence and machine learning, fault prediction for storage devices has attracted extensive attention. In conventional fault prediction methods, due to the low accuracy of fault prediction and the lack of effective analysis on fault causes, resources of storage devices are wasted and the cost of a storage system is thus increased.

SUMMARY OF THE INVENTION

The embodiments of the present disclosure provide a method, a device, and a computer program product for managing a storage system.

In a first aspect of the present disclosure, a method for managing a storage system is provided. The method includes: if it is determined based on current values of a plurality of attribute parameters of a storage device in a storage system that the storage device will have a fault, determining whether the fault of the storage device will not occur again based on reference values of attribute parameters in a first set in the plurality of attribute parameters and current values of attribute parameters in a second set in the plurality of attribute parameters. The method further includes: if it is determined that the fault of the storage device will not occur again, determining the cause of the fault based on the attribute parameters in the first set.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: if it is determined based on current values of a plurality of attribute parameters of a storage device in a storage system that the storage device will have a fault, determining whether the fault of the storage device will not occur again based on reference values of attribute parameters in a first set in the plurality of attribute parameters and current values of attribute parameters in a second set in the plurality of attribute parameters. The method further includes: if it is determined that the fault of the storage device will not occur again, determining the cause of the fault based on the attribute parameters in the first set.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention section is provided to introduce the selection of concepts in a simplified form, which will be further described in the Detailed Description below. The Summary of the Invention section is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

In the accompanying drawings, the same or corresponding numerals represent the same or corresponding parts.

DETAILED DESCRIPTION

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Instead, the embodiments are provided to make the present disclosure more thorough and complete and to fully convey the scope of the present disclosure to those skilled in the art.

The term "include" and variants thereof as used herein indicate open-ended inclusion, i.e., "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or the same objects. Other explicit and implicit definitions may also be included below.

Since a storage device of a storage system usually stores a large amount of important data, if the storage device has a fault, the large amount of important data may be lost. Therefore, in order to avoid data loss, it is necessary to predict whether the storage device will have a fault.

In a conventional solution, a machine learning-based fault prediction method is used to predict whether a storage device will have a fault. When improving the machine learning-based fault prediction method, the usual concern is to train the accuracy of a model to improve the accuracy of fault prediction without considering a cause of a fault of the storage device.

The above conventional solution has encountered some problems in actual use. For example, in actual use, when it is determined that a storage device will have a fault due to an external cause such as a cable connection fault and excessive usage temperature, the storage device does not actually have an internal fault, that is, there is actually no problem with the storage device itself. However, in this case, since a user does not know a specific fault cause, the storage device will usually be removed directly. Therefore, in the conventional solution, even if some storage devices do not have internal faults, users are likely to remove the storage devices directly to eliminate the faults. This mode will cause waste of storage devices. In addition, when it is determined that a storage device will have a fault due to an external cause, for example, when a cable connection of the storage device has a fault, the storage device does not actually have an internal fault. In the conventional solution, a user is likely to remove the storage device and replace the storage device with a new storage device. Since the cable connection fault has not been corrected, the new storage device will still have a fault, which does not solve the fault problem of the storage device.

In addition, according to the conventional solution, before the storage device is removed, it is also necessary to take time and consume resources to back up data stored therein. After the storage device is removed, it is also necessary to replace the storage device with a new storage device. This will further take time and consume resources to store backup data to the new storage device, thus resulting in further waste of time and resources. During the backup process and data transfer process, a large number of input/output (I/O) operations are involved, which will also affect the performance of the storage system.

The embodiments of the present disclosure provide a solution for managing a storage system to solve one or more of the above problems and other potential problems. In this solution, if it is determined based on current values of a plurality of attribute parameters of a storage device in a storage system that the storage device will have a fault, an indication of removing the storage device is not provided directly, but it is determined whether the fault of the storage device will occur again based on reference values of attribute parameters in a first set and current values of attribute parameters in a second set in these attribute parameters. if it is determined that the fault will not occur again, a cause of the fault is determined based on the attribute parameters in the first set.

The embodiments of the present disclosure can analyze a cause of a fault of a storage device, avoid the misjudgment of a storage device having no internal fault as a storage device having an internal fault, and further avoid the unnecessary removal of the storage device having no internal fault, thereby saving the cost. In this way, it is also possible to reduce a lot of I/O operations of the storage system for backing up the storage device to be removed, thus saving time and resources and improving the performance of the storage system.

The embodiments of the present disclosure will be described in detail below with reference to the accompanying drawings.

Figure 1:
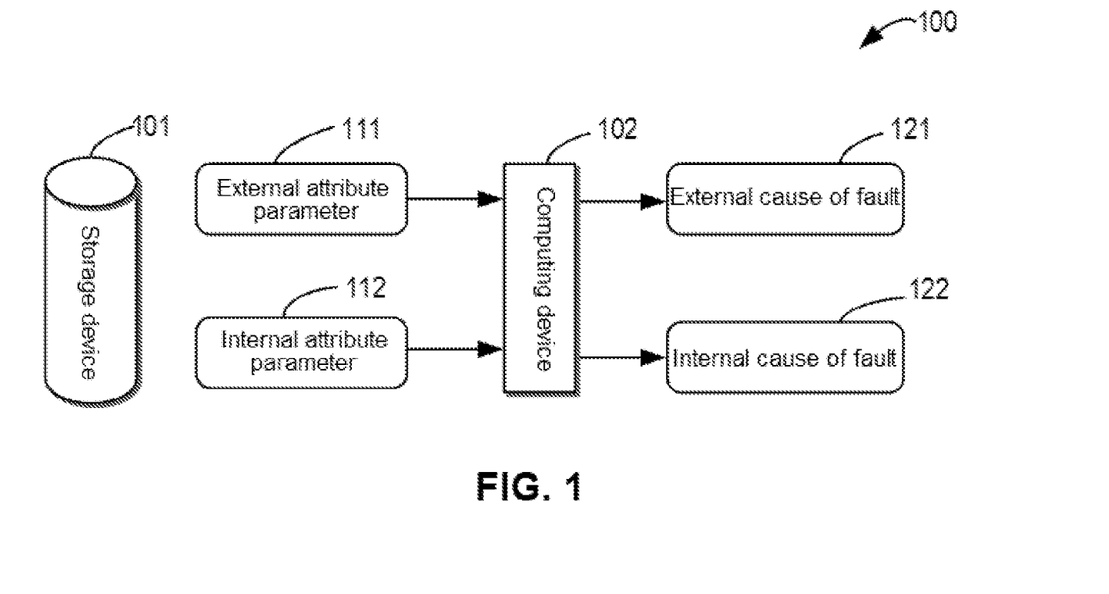
FIG. 1 shows a schematic diagram of an example system in which some embodiments of the present disclosure can be implemented.

FIG. 1 shows a schematic diagram of example storage system 100 in which some embodiments of the present disclosure can be implemented. Storage system 100 includes storage device 101 configured to store data. Storage system 100 stores a plurality of attribute parameters related to storage device 101, including external attribute parameter 111 and internal attribute parameter 112. External attribute parameter 111 is an attribute parameter associated with a usage environment of storage device 101, for example, a cable connection parameter or a temperature parameter. Internal attribute parameter 112 is an attribute parameter associated with an internal operation of storage device 101, such as a service life parameter, a dielectric loss parameter, or other internal parameters.

Storage system 100 further includes computing device 102, and computing device 102 may determine whether storage device 101 will have a fault based on external attribute parameter 111 and internal attribute parameter 112. If it is determined that storage device 101 will have a fault, computing device 102 may further determine a cause of the fault of storage device 101. The cause of the fault of storage device 101 may include external cause 121 of the fault and internal cause 122 of the fault. External cause 121 is, for example, a cause associated with a usage environment of storage device 101. For example, external cause 121 may be a cable connection fault, a temperature value not within a normal range, or other causes unrelated to an internal operation of the storage device. Internal cause 122 may be a cause associated with an internal operation of storage device 101, such as an excessively long working life, a severe dielectric loss, or other internal causes.

It should be understood that example storage system 100 in FIG. 1 is only illustrative and not restrictive. According to the embodiments of the present disclosure, storage system 100 may be implemented in any suitable manner. For example, storage system 100 may include any suitable number of storage devices 101, and these storage devices may be connected or arranged in any suitable manner. Examples of storage device 101 may include, but are not limited to, hard disk devices, tape drives, optical drives, hard disk drives (HDD), solid storage devices (SSD), redundant arrays of independent disks (RAID), or other hard disk devices.

Figure 2:
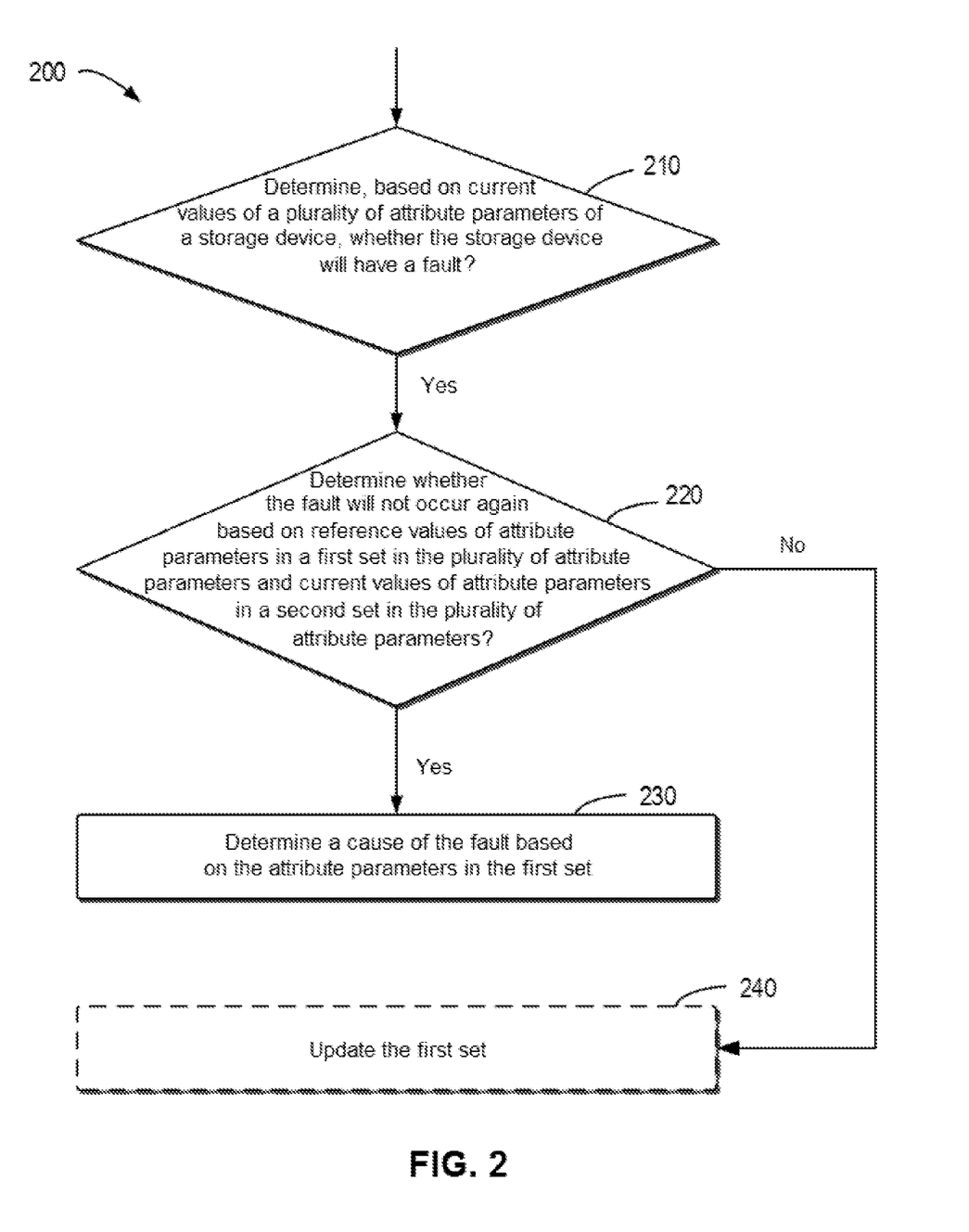
FIG. 2 shows a flow chart of an example method for predicting and analyzing a fault of a storage device according to some embodiments of the present disclosure.

FIG. 2 shows a flow chart of example method 200 for managing storage system 100 according to some embodiments of the present disclosure. Method 200 may be, for example, performed by computing device 102 of storage system 100 shown in FIG. 1. It should be understood that method 200 may also be performed by other suitable devices or apparatuses. Method 200 may include additional actions not shown and/or may omit actions shown, and the scope of the present disclosure is not limited in this regard. Method 200 is described in detail below with reference to FIG. 1.

As shown in FIG. 2, at 210, computing device 102 determines whether storage device 101 will have a fault based on current values of a plurality of attribute parameters of storage device 101. The plurality of attribute parameters may include any suitable parameters indicating the state of storage device 101. In some embodiments, the plurality of attribute parameters of storage device 101 may include external attribute parameter 111 associated with a usage environment of storage device 101 and internal attribute parameter 112 associated with an internal operation of storage device 101.

In some embodiments, external attribute parameters 111 may include attribute parameters as shown in Table 1. Specifically, external attribute parameter 111 may include two sub-classes: a cable connection parameter and a temperature parameter. The cable connection parameter may include the number of cable connection resets and the number of cable connection faults. The temperature parameter may include the temperature of a storage device. It should be understood that external attribute parameter 111 in Table 1 is only illustrative and not restrictive. In some embodiments, external attribute parameter 111 may further include other parameters related to a usage environment of storage device 101, such as the humidity of a usage environment of storage device 101.

TABLE 1

Example of external attribute parameter

| External attribute parameter | Cable connection parameter | Number of cable connection resets |
| --- | --- | --- |
| | | Number of cable connection faults |
| | Temperature parameter | Storage device temperature |

In some embodiments, internal attribute parameter 112 may include attribute parameters as shown in Table 2. Specifically, internal attribute parameter 112 may include sub-classes such as a service life parameter, a dielectric loss parameter, and other internal parameters. The service life parameter may include a power-on time, the number of switches, etc. The dielectric loss parameter may include the number of read and write errors, the number of sector re-allocations, and the number of drive faults. Other internal parameters may further include the number of drive head faults. It should be understood that internal attribute parameter 112 in Table 2 is only illustrative and not restrictive. In some embodiments, internal attribute parameter 112 may further include other attribute parameters associated with an internal operation of storage device 101.

TABLE 2

Example of internal attribute parameter

| Internal attribute parameter | Service life parameter | Power-on time |
| --- | --- | --- |
| | | Number of switches |
| | Dielectric loss parameter | Number of read and write errors |
| | | Number of sector re-allocations |
| | | Number of drive faults |
| | Other internal parameters | Number of drive head faults |

Returning to FIG. 2, if it is determined at 210 that storage device 101 will have a fault, method 200 proceeds to 220. At 220, computing device 102 determines whether the fault will not occur again based on reference values of attribute parameters in a first set in the plurality of attribute parameters and current values of attribute parameters in a second set in the plurality of attribute parameters. In some embodiments, the reference value of an attribute parameter may be an average value of such attribute parameters of normal storage devices that are stored in historical data of storage system 100. In other embodiments, a standard value of an attribute parameter may also be a standard value of the attribute parameter provided by a manufacturer of the storage device, or another attribute parameter value corresponding to a normal storage device.

In some embodiments, the first set may be a set of at least one attribute parameter randomly selected from the plurality of attribute parameters. The second set may be randomly determined from attribute parameters among the plurality of attribute parameters other than the attribute parameters included in the first set.

In some other embodiments, the first set may include at least one external attribute parameter 111 randomly selected from the plurality of attribute parameters, and may also include other additional attribute parameters. The second set may be determined from attribute parameters among the plurality of attribute parameters other than the attribute parameters included in the first set. In this way, since at least one external attribute parameter 111 is included in the first set, it is easier to determine whether a cause of a fault includes an external cause.

In some embodiments, the first set may be determined from the plurality of attribute parameters based on historical fault information of storage device 101. The historical fault information includes a fault rate associated with each of a plurality of candidate attribute parameters. The first set may include an attribute parameter having the highest fault rate. The second set may be determined from attribute parameters among the plurality of attribute parameters other than the attribute parameters included in the first set. Since the first set includes the attribute parameter having the highest fault rate in a history record, and a cause corresponding to the attribute parameter having the highest fault rate is the cause of the highest fault rate in the history record, an cause of the fault can be more easily determined based on the first set determined in this way.

If it is determined at 220 that the fault of storage device 101 will not occur again, method 200 proceeds to 230. At 230, computing device 102 determines a cause of the fault based on the attribute parameters in the first set. In some embodiments, a cause of the fault may include external cause 121 of the fault and internal cause 122 of the fault. In the following description with reference to FIGS. 3 to 4, the process of determining a cause of a fault will be described in more detail.

Returning to FIG. 2, if it is determined at 220 that the fault of storage device 101 will still occur, method 200 proceeds to 240. At 240, computing device 102 updates the first set. In some embodiments, the first set may be updated by moving at least one attribute parameter from the second set to the first set. In other embodiments, the first set may be updated by moving at least one attribute parameter in the first set to the second set. Alternatively or additionally, it is also possible to update the first set by moving at least one attribute parameter from the second set to the first set and moving at least one attribute parameter in the first set to the second set. It should be understood that the process of updating the first set described above is only illustrative and not restrictive. In other embodiments, other modes may also be used to update the first set. In some embodiments, additionally or alternatively, after the first set is updated, a cause of the fault of storage device 101 may also be determined based on the updated first set.

Through the above mode, the cause of the fault of storage device 101 may be predicted, so as to avoid the misjudgment of a storage device having no internal fault as a storage device having an internal fault, and further avoid the unnecessary removal of the storage device having no internal fault. In addition, since the cause of the fault of storage device 101 has been predicted, a user can be more confident when deciding whether to remove the faulted storage device. In this way, it is also possible to reduce a lot of I/O operations of the storage system for backing up the storage device to be removed, thus saving time and resources and improving the performance of the storage system.

Figure 3:
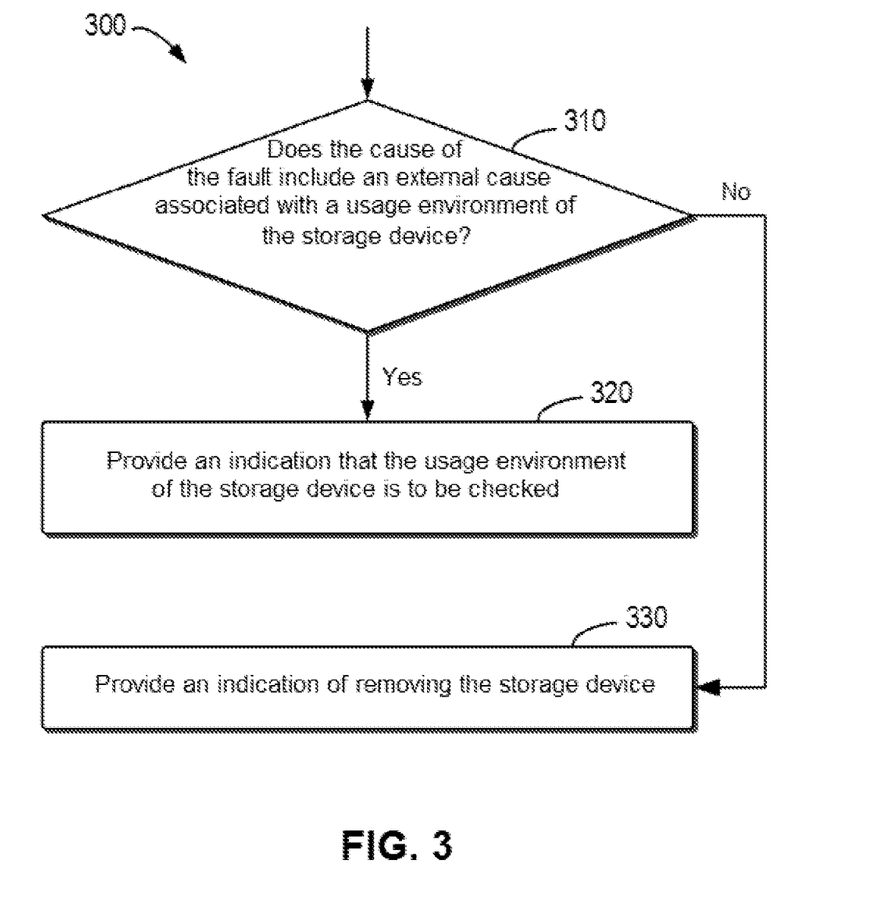
FIG. 3 shows a schematic diagram of an example method for analyzing a cause of a fault of a storage device according to some embodiments of the present disclosure.
Figure 4:
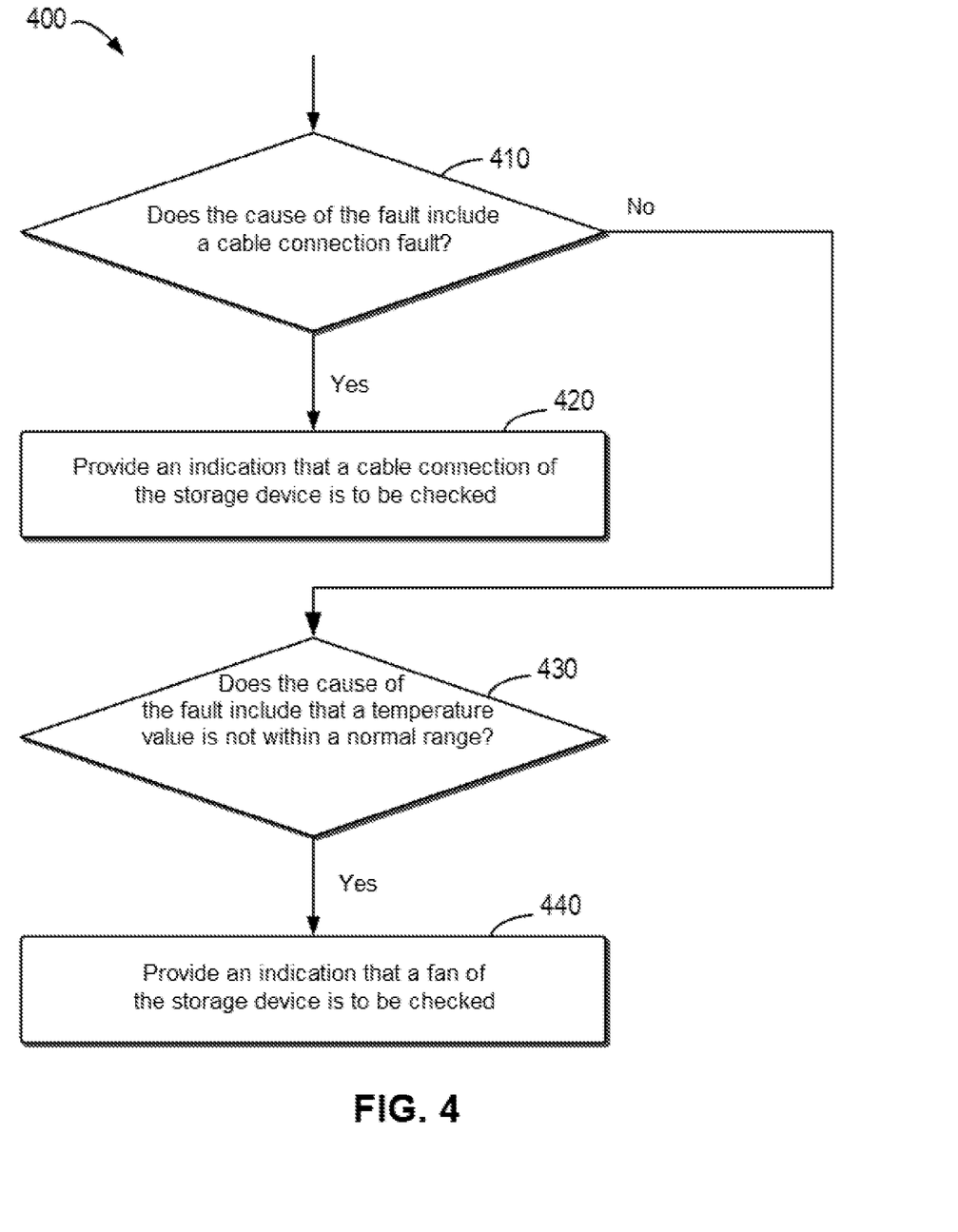
FIG. 4 shows a schematic diagram of another example method for analyzing a cause of a fault of a storage device according to some embodiments of the present disclosure.

In some embodiments, methods 300 and 400 shown in FIGS. 3 to 4 may be used to determine a cause of a fault of storage device 101. Several embodiments for determining a cause of a fault of storage device 101 will be described in more detail below in conjunction with FIGS. 3 to 4.

FIG. 3 shows a schematic diagram of example method 300 for analyzing a cause of a fault of storage device 101 according to some embodiments of the present disclosure. Method 300 may be regarded as an example implementation of block 230 in method 200. As shown in FIG. 3, at 310, computing device 102 determines whether a cause of the fault of storage device 101 includes an external cause associated with a usage environment of storage device 101. In some embodiments, by determining whether external attribute parameter 111 is included in the first set as described with reference to FIG. 2, it is possible to determine whether the cause of the fault of storage device 101 includes an external cause associated with a usage environment of storage device 101. If external attribute parameter 111 is included in the first set, the cause of the fault of storage device 101 includes an external cause. If external attribute parameter 111 is not included in the first set, the cause of the fault of storage device 101 does not include an external cause.

If it is determined at 310 that the cause of the fault of storage device 101 includes an external cause, method 300 proceeds to 320. At 320, an indication that the usage environment of storage device 101 is to be checked is provided. If it is determined at 310 that the cause of the fault of storage device 101 does not include an external cause, method 300 proceeds to 330. At 330, an indication of removing storage device 101 is provided.

In this way, the cause of the fault of storage device 101 may be predicted. In particular, when method 300 is used to determine that the cause of the fault of storage device 101 includes an external cause, an indication that storage device 101 is to be removed is not provided, but an indication that the usage environment of storage device 101 is to be checked is provided. In this way, for a user, the cause of the fault of storage device 101 can be easily and accurately known, so that the fault can be eliminated efficiently. Therefore, it is possible to avoid the unnecessary removal of storage device 101 having no internal fault, thereby saving the cost.

In some embodiments, a cause of a fault of storage device 101 may also be determined in more detail. FIG. 4 shows a schematic diagram of example method 400 for analyzing a cause of a fault of storage device 101 according to some embodiments of the present disclosure. Method 400 may be regarded as an example implementation of blocks 310 and 320 in method 300. At 410, computing device 102 determines whether a cause of a fault includes a cable connection fault. For example, it is possible to determine whether the cause of the fault includes a cable connection fault by determining whether the cable connection parameter as listed in Table 1 is included in the first set as described with reference to FIG. 2. If the cable connection parameter is included in the first set, it is determined that the cause of the fault includes a cable connection fault. When the cable connection parameter is not included in the first set, it is determined that the cause of the fault does not include a cable connection fault.

If it is determined at 410 that the cause of the fault includes a cable connection fault, method 400 proceeds to 420. At 420, an indication that a cable connection of storage device 101 is to be checked is provided.

If it is determined at 410 that the cause of the fault does not include a cable connection fault, method 400 proceeds to 430. At 430, computing device 102 determines whether the cause of the fault includes that a temperature value is not within a normal range. For example, it is possible to determine whether the cause of the fault includes that a temperature value is not within a normal range by determining whether the temperature parameter listed in Table 1 is included in the first set. If the temperature parameter is included in the first set, it is determined that the cause of the fault includes that a temperature value is not within a normal range. Conversely, if the temperature parameter is not included in the first set, it is determined that the cause of the fault does not include that a temperature value is not within a normal range.

If it is determined at 430 that the cause of the fault includes that a temperature value is not within a normal range, method 400 proceeds to 440. At 440, an indication that a fan of storage device 101 is to be checked is provided.

The foregoing describes an example implementation of determining a cause of a fault of storage device 101 in conjunction with FIGS. 3 to 4, but this is only illustrative. Other methods may also be used to determine a cause of a fault.

Through the above mode, a cause of a fault of storage device 101 may be predicted. In particular, if method 400 is used to determine that a cause of a fault of storage device 101 includes an external cause such as a cable connection fault or a temperature value not within a normal range, an indication that storage device 101 is to be removed will not be provided, but an indication that the usage environment of storage device 101 such as a cable connection situation or a fan operation situation is to be checked is provided. In this way, the unnecessary removal of storage device 101 having no internal fault can be avoided. Therefore, waste of storage devices can be avoided. In addition, in this way, it is possible to provide an indication that the cable connection situation or the fan operation situation of storage device 101 is to be checked, so that the user can check the cable connection situation or the fan operation situation of storage device 101 and then may recover the normal operation of storage device 101.

Figure 5:
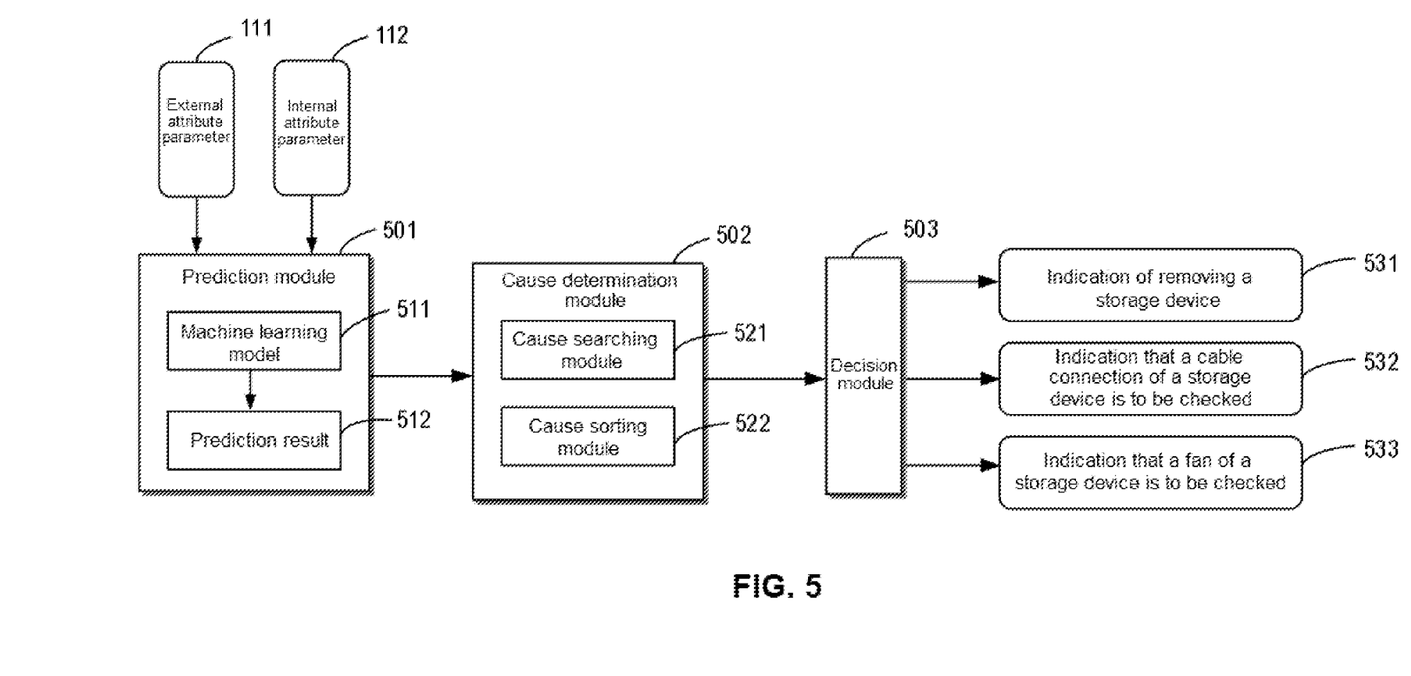
FIG. 5 shows a more detailed schematic block diagram of predicting and analyzing a fault of a storage device according to some embodiments of the present disclosure.

FIG. 5 shows a more detailed schematic block diagram of predicting and analyzing a fault of storage device 101 according to some embodiments of the present disclosure. Prediction module 501, cause determination module 502, and decision module 503 in FIG. 5 may be implemented in computing device 102 shown in FIG. 1. It should be understood that prediction module 501, cause determination module 502, and decision module 503 may also be executed by other suitable devices or apparatuses.

As shown in FIG. 5, prediction module 501 may be used to predict whether storage device 101 will have a fault based on external attribute parameter 111 and internal attribute parameter 112. In some embodiments, external attribute parameter 111 and internal attribute parameter 112 may include attribute parameters listed in Table 1 and Table 2. In other embodiments, external attribute parameter 111 and internal attribute parameter 112 may further include other attribute parameters.

As shown in FIG. 5, prediction module 501 may predict whether storage device 101 will have a fault based on machine learning model 511, and obtain prediction result 512. In some embodiments, machine learning model 511 may be trained machine learning model 511, such as a trained neural network model. It should be understood that machine learning model 511 may be other machine learning models.

If prediction result 512 indicates that the storage device will not have a fault, no further action is required. When prediction result 512 indicates that the storage device will have a fault, cause determination module 502 is used to search and sort causes of the fault.

As shown in FIG. 5, cause determination module 502 includes cause searching module 521 and cause sorting module 522, and cause searching module 521 may be used to find out possible causes of the fault of storage device 101. For example, the possible causes of the fault of storage device 101 may include single cause (SRC) and multiple cause (MRC).

First, cause determination module 502 may use the following formulas (1)-(2) to find out the possible single cause (SRC).

$$\exists F \in FC: P(MF(I,F))=0 \char`\^ P(I)=1 \qquad (1)$$

$$SRC=\{F_1, F_2 \ldots F_n\} \qquad (2)$$

In formulas (1) and (2), FC represents a sub-class attribute set. For example, referring to Table 1 and Table 2, FC={service life parameter, dielectric loss parameter, other internal parameters, cable connection parameter, temperature parameter}. F represents any sub-class in the sub-class attribute set FC. For example, F represents a cable connection parameter sub-class. $F=\{F_1, F_2 \ldots F_n\}$ represents that F may include a plurality of attribute parameters belonging to the sub-class $F_1, F_2 \ldots F_n$. For example, when F represents a cable connection parameter sub-class, F may include the numbers of cable connection resets and the number of cable connection faults as shown in Table 1. That is $F=\{F_1, F_2\}$, $F_1$ represents the number of cable connection resets, and $F_2$ represents the number of cable connection faults. In some embodiments, FC may also be other sub-class attribute sets.

Returning to formula (1), I represents a set of current values of a plurality of attribute parameters of storage device 101, and each of the plurality of attribute parameters belongs to a sub-class in FC. Attribute parameters belonging to F in I form a first set, and other attribute parameters form a second set. MF (I,F) represents a set of reference values of the attribute parameters in the first set and current values of the attribute parameters in the second set. For example, the reference value may be an average value of such attribute parameters of normal storage devices that are stored in historical data of storage system 100.

In formula (1), P(MF(I,F))=0, P(I)=1 represents that prediction results of prediction module 501 based on MF(I,F), I are 0 and 1, respectively. The result 0 represents that the prediction result is that storage device 101 will not have a fault, and the result 1 represents that the prediction result is that storage device 101 will have a fault. In other embodiments, a result output by prediction module 501 may also be any other values between 0 and 1, and an upper threshold and a lower threshold may be set (for example, the upper threshold may be 0.9, and the lower threshold may be 0.1). When the output result of prediction module 501 P(·) is higher than the upper threshold, it means that storage device 101 will have a fault, and when the output result of prediction module 501 P(·) is lower than the lower threshold, it means that storage device 101 will not have a fault. If there is a sub-class F satisfying formula (1) in FC, cause searching module 521 finds a single cause SRC=F={$F_1, F_2 \ldots F_n$}.

In some embodiments, if a single cause SRC is found using cause searching module 521, cause sorting module 522 will not be used for sorting, but cause determination module 502 directly outputs the single cause SRC to decision module 503.

On the contrary, if cause searching module 521 cannot find a single cause SRC, cause searching module 521 continues to use the following formulas (3)-(5) to find out all multiple causes (MRC).

$$\exists MRC \subseteq FC: P(MS(I,MRC))=0 \char`\^ P(I)=1 \qquad (3)$$

$$\nexists S \subset MRC: P(MS(I,S))=0 \char`\^ P(I)=1 \qquad (4)$$

$$E=\{MRC_1, MRC_2, MRC_3 \ldots MRC_m\} \qquad (5)$$

In formulas (3)-(5), MRC represents a subset of a set FC, I represents a set of current values of a plurality of attribute parameters of storage device 101, attribute parameters belonging to MRC in I form a first set, and other attribute parameters form a second set. MS(I, MRC) represents a set of reference values of the attribute parameters in the first set and current values of the attribute parameters in the second set, and P(MS(I, MRC)) represents that a result of prediction by prediction module 501 based on MS(I, MRC) is that storage device 101 will not have a fault. Formula (3) shows that MRC is a multiple cause satisfying the condition MRC. In formula (4), S is a subset of MRC, and formula (4) represents that there is no subset enabling MRCP(MS(I,S))=0 S. Formula (5) represents that all multiple causes $MRC_1$, $MRC_2$, $MRC_3 \ldots MRC_m$ satisfying formulas (3) and (4) form a set of multiple causes E. Through the above mode, cause searching module 521 may find out a set $MRC_1$, $MRC_2$, $MRC_3 \ldots MRC_m$ of all possible multiple causes, thereby avoiding the omission of fault causes. E In some embodiments, after cause searching module 521 finds a set of all multiple causes E, cause determination module 502 may output the set to decision module 503. Alternatively or additionally, after the set of all multiple causes E is found, cause sorting module 522 may also be used to sort the multiple causes in the set E of all multiple causes to determine the most important causes. For example, cause sorting module 522 may be used to determine the three most important causes. Cause sorting module 522 uses the following formulas (6)-(7) to sort the multiple causes in the set of all multiple causes E.

$$\text{importance (sub-class)} = \sum_{i=1}^{m} \frac{1}{Num(MRC_i)} * f(MRC_i, \text{sub-class}) \qquad (6)$$

$$f(MRC, \text{sub-class}) = \begin{cases} 1 \text{ if sub-class in } MRC \\ 0 \text{ if sub-class not in } MRC \end{cases} \qquad (7)$$

In formula (7), sub-class represents a sub-class, such as sub-class $F_1$. If sub-class $F_1$ belongs to MRC, f(MRC, $F_1$) the value of function is 1; otherwise, the value of f(MRC, $F_1$) is 0. Next, formula (6) is used to calculate the importance of sub-class $F_1$. When there are m multiple causes $MRC_1$-$MRC_m$ that include sub-class $F_1$, for each $MRC_i$, i=1, . . . , m that includes sub-class $F_1$, the number Num($MRC_i$) of all sub-classes in $MRC_i$ is calculated. Next, for $MRC_i$, a value f($MRC_i$, $F_1$) is calculated using formula (7), values obtained by dividing $f(MRC_i, F_1)$ of each $MRC_i$ by the number $Num(MRC_i)$ are added, and the importance of sub-class $F_1$ is finally obtained. It should be understood that in other embodiments, other modes may also be used to calculate the importance of a sub-class. After calculating the importance of each sub-class, the sub-classes are sorted according to a descending order of importance values, and at least one sub-class having the highest importance value is selected. For example, three sub-classes having the highest importance value may be selected and may be output to decision module 503.

In this way, cause sorting module 522 is used to sort possible fault causes according to the importance, and one or more of the most important causes are found therefrom, so as to avoid the interference of less important causes on decision module 503 and improve the accuracy and efficiency of decision module 503.

In some embodiments, decision module 503 may be further included. Decision module 503 may receive a single cause or multiple most important causes output by cause determination module 502, analyze the received causes, and provide a decision. If decision module 503 only receives a single cause, decision module 503 may determine whether the cause is associated with an internal attribute parameter. When the cause is associated with an internal attribute parameter, for example, associated with a service life parameter, decision module 503 outputs indication 531 that the storage device is to be removed. Decision module 503 may further determine whether the cause is associated with a cable fault, and when the cause is associated with a cable fault, decision module 503 outputs indication 532 that a cable connection of the storage device is to be checked. In addition, when decision module 503 determines that the cause is related to temperature, indication 533 that a fan of the storage device is to be checked is output.

If cause determination module 502 outputs multiple causes to the decision module, decision module 503 will judge the classes of the multiple causes. When an external cause associated with an external attribute parameter is not included in the multiple causes, decision module 503 outputs indication 531 of removing the storage device. When a cause associated with a cable connection fault is included in the multiple causes, decision module 503 outputs indication 532 that the cable connection of the storage device is to be checked. In addition, when the multiple causes received by decision module 503 include a cause associated with temperature, decision module 503 outputs indication 533 that the fan of the storage device is to be checked. It should be understood that decision module 503 may also make additional judgments and output other additional indications.

Through the above mode, cause determination module 502 may predict a cause of a fault of storage device 101. For a case where the fault cause includes an external cause, decision module 503 will not output an indication that storage device 101 is to be removed, but will output an indication that the usage environment is to be checked (for example, outputting indication 532 that the cable connection of the storage device is to be checked and outputting indication 533 that the fan of the storage device is to be checked). In this way, the unnecessary removal of storage device 101 having no internal fault can be avoided, thereby saving the cost. In addition, in this way, the accuracy of a prediction method based on machine learning for the fault prediction of storage device 101 can be improved, and a fault prediction method based on machine learning can be well applied to storage system 100.

In other embodiments, for a case where the fault cause includes both external and internal causes, decision module 503 outputs an indication that the usage environment (for example, the cable connection and the fan) of storage device 101 is to be checked and then needs to be reconfirmed. In this way, a user will first check the usage environment of storage device 101 to ensure that the cable connection is normal and the fan operates normally. After it has been confirmed that the usage environment is normal, prediction module 501 may be used to predict again whether storage device 101 has a fault to ensure that storage device 101 does not have an internal fault, thereby improving the accuracy of fault prediction.

Figure 6:
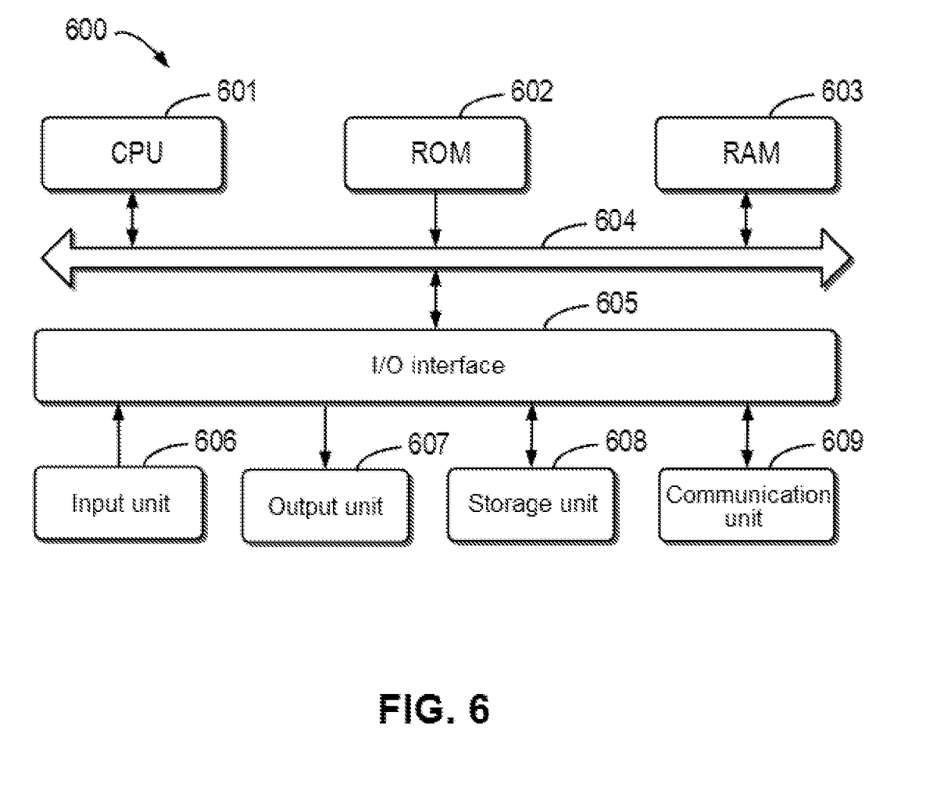
FIG. 6 shows a schematic block diagram of an example device that may be configured to implement an embodiment of the present disclosure.

FIG. 6 shows a schematic block diagram of example device 600 that may be configured to implement an embodiment of the present disclosure. For example, storage system 100 as shown in FIG. 1 may be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to one another through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, for example, methods 200, 300, and/or 400, may be performed by processing unit 601. For example, in some embodiments, methods 200, 300, and/or 400 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of methods 200, 300, and/or 400 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any appropriate combination thereof. More specific examples (a non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any appropriate combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing the state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system by a processing unit, comprising:
    identifying values of a plurality of attribute parameters of a storage device in the storage system;
    upon determining,
    based on the values of the plurality of attribute parameters, that the storage device will have a fault, determining, by the processing unit, whether the fault will not occur again based on reference values of attribute parameters in a first set in the plurality of attribute parameters and current values of attribute parameters in a second set in the plurality of attribute parameters;

upon determining that the fault will occur again, updating the first set and determining a cause of the fault based on the updated first set;

upon determining that the fault will not occur again, determining the cause of the fault based on the attribute parameters in the first set; and outputting an indication associated with the cause of the fault.

2. The method according to claim 1, further comprising:
acquiring the values of the plurality of attribute parameters of the storage device, the plurality of attribute parameters comprising external attribute parameters associated with a usage environment of the storage device and internal attribute parameters associated with an internal operation of the storage device.

3. The method according to claim 2, wherein determining a cause of the fault comprises:
if the external attribute parameters are comprised in the first set, determining that the cause of the fault comprises an external cause associated with the usage environment of the storage device; and
if the internal attribute parameters are comprised in the first set, determining that the cause of the fault comprises an internal cause associated with the internal operation of the storage device.

4. The method according to claim 2, further comprising:
determining the first set from the plurality of attribute parameters, the first set comprising at least one of the external attribute parameters; and
determining the second set from attribute parameters among the plurality of attribute parameters other than the attribute parameters comprised in the first set.

5. The method according to claim 2, wherein the external attribute parameters comprise at least one of the following: the temperature of the storage device, the number of connection resets of a cable of the storage device, and the number of connection faults of the cable; and
the internal attribute parameters comprise at least one of the following: a power-on time of the storage device, the number of switches of the storage device, the number of read and write errors of the storage device, the number of sector re-allocations of the storage device, and the number of drive faults of the storage device.

6. The method according to claim 1, further comprising:
if it is determined that the fault will occur again, updating the first set by moving at least one attribute parameter from the second set to the first set; and
determining the cause of the fault based at least on the updated first set.

7. The method according to claim 1, further comprising:
if it is determined that the fault will occur again, updating the first set by moving at least one attribute parameter in the first set to the second set; and
determining the cause of the fault based at least on the updated first set.

8. The method according to claim 1, further comprising:
if it is determined that the cause comprises an external cause associated with a usage environment of the storage device, providing an indication that the usage environment of the storage device is to be checked; and
if it is determined that the cause only comprises an internal cause associated with an internal operation of the storage device, providing an indication of removing the storage device.

9. The method according to claim 1, further comprising:
determining the first set from the plurality of attribute parameters based on historical fault information of the storage device, the historical fault information comprising a fault rate associated with each of the plurality of candidate attribute parameters, and the first set comprising an attribute parameter having the highest fault rate; and
determining the second set from attribute parameters among the plurality of attribute parameters other than the attribute parameters comprised in the first set.

10. An electronic device, comprising:
at least one processor; and
at least one memory coupled to the at least one processor and storing instructions, which when executed by the at least one processor, cause the device to perform actions, comprising:
identifying values of a plurality of attribute parameters of a storage device in the storage system;
upon determining, based on the values of a plurality of attribute parameters, that the storage device will have a fault, determining, by the at least one processor, whether the fault will not occur again based on reference values of attribute parameters in a first set in the plurality of attribute parameters and current values of attribute parameters in a second set in the plurality of attribute parameters;
upon determining that the fault will occur again, updating the first set and determining a cause of the fault based on the updated first set;
upon determining that the fault will not occur again, determining the cause of the fault based on the attribute parameters in the first set; and
outputting an indication associated with the cause of the fault.

11. The electronic device according to claim 10, wherein the actions further comprise:
acquiring the values of the plurality of attribute parameters of the storage device, the plurality of attribute parameters comprising external attribute parameters associated with a usage environment of the storage device and internal attribute parameters associated with an internal operation of the storage device.

12. The electronic device according to claim 11, wherein determining a cause of the fault comprises:
if the external attribute parameters are comprised in the first set, determining that the cause of the fault comprises an external cause associated with the usage environment of the storage device; and
if the internal attribute parameters are comprised in the first set, determining that the cause of the fault comprises an internal cause associated with the internal operation of the storage device.

13. The electronic device according to claim 11, wherein the actions further comprise:
determining the first set from the plurality of attribute parameters, the first set comprising at least one of the external attribute parameters; and
determining the second set from attribute parameters among the plurality of attribute parameters other than the attribute parameters comprised in the first set.

14. The electronic device according to claim 11, wherein the external attribute parameters comprise at least one of the following: the temperature of the storage device, the number of connection resets of a cable of the storage device, and the number of connection faults of the cable; and     the internal attribute parameters comprise at least one of the following: a power-on time of the storage device, the number of switches of the storage device, the number of read and write errors of the storage device, the number of sector re-allocations of the storage device, and the number of drive faults of the storage device.

15. The electronic device according to claim 10, wherein the actions further comprise:

if it is determined that the fault will occur again, updating the first set by moving at least one attribute parameter from the second set to the first set; and     determining the cause of the fault based at least on the updated first set.

16. The electronic device according to claim 10, wherein the actions further comprise:

if it is determined that the fault will occur again, updating the first set by moving at least one attribute parameter in the first set to the second set; and     determining the cause of the fault based at least on the updated first set.

17. The electronic device according to claim 10, wherein the actions further comprise:

if it is determined that the cause comprises an external cause associated with a usage environment of the storage device, providing an indication that the usage environment of the storage device is to be checked; and     if it is determined that the cause only comprises an internal cause associated with an internal operation of the storage device, providing an indication of removing the storage device.

18. The electronic device according to claim 10, wherein the actions further comprise:

determining the first set from the plurality of attribute parameters based on historical fault information of the storage device, the historical fault information comprising a fault rate associated with each of the plurality of candidate attribute parameters, and the first set comprising an attribute parameter having the highest fault rate; and     determining the second set from attribute parameters among the plurality of attribute parameters other than the attribute parameters comprised in the first set.

19. A non-transitory computer-readable medium and comprising machine-executable instructions, which when executed by a processor cause the processor to perform actions, the actions comprising:

identifying values of a plurality of attribute parameters of a storage device in the storage system;

upon determining, based on the values of a plurality of attribute parameters, that the storage device will have a fault, determining, by the processor, whether the fault will not occur again based on reference values of attribute parameters in a first set in the plurality of attribute parameters and current values of attribute parameters in a second set in the plurality of attribute parameters;

upon determining that the fault will occur again, updating the first set and determining a cause of the fault based on the updated first set;

upon determining that the fault will not occur again, determining a cause of the fault based on the attribute parameters in the first set; and     outputting an indication associated with the cause of the fault.

20. The computer-readable medium according to claim 19, wherein the actions further comprise:

acquiring the values of the plurality of attribute parameters of the storage device, the plurality of attribute parameters comprising external attribute parameters associated with a usage environment of the storage device and internal attribute parameters associated with an internal operation of the storage device.

\* \* \* \* \*